United States Patent
Yu

(10) Patent No.: US 6,474,014 B1
(45) Date of Patent: Nov. 5, 2002

(54) EXHAUST VENTILATOR CAPABLE OF DRIVING AWAY MOSQUITOES

(76) Inventor: Fang-Chun Yu, PO Box 82-144, Taipei (TW)

( * ) Notice: Subject to any disclaimer, the term of this patent is extended or adjusted under 35 U.S.C. 154(b) by 0 days.

(21) Appl. No.: 09/704,715

(22) Filed: Nov. 3, 2000

(51) Int. Cl.[7] .............................................. A01M 19/00
(52) U.S. Cl. ............................................. 43/98; 43/119
(58) Field of Search .......................... 43/98, 107, 112, 43/119, 132.1, 138, 139

(56) References Cited

U.S. PATENT DOCUMENTS

| | | | | |
|---|---|---|---|---|
| 5,004,446 A | * | 4/1991 | Guong-Hong | 449/1 |
| 5,157,865 A | * | 10/1992 | Chang | 43/113 |
| 5,241,779 A | * | 9/1993 | Lee | 43/139 |
| 5,255,468 A | * | 10/1993 | Cheshire, Jr. | 43/113 |
| 6,050,025 A | * | 4/2000 | Wilbanks | 43/112 |
| 6,134,826 A | * | 10/2000 | Mah | 43/112 |
| 6,305,122 B1 | * | 10/2001 | Iwao et al. | 43/112 |

* cited by examiner

*Primary Examiner*—Charles T. Jordan
*Assistant Examiner*—Kimberly S. Smith
(74) *Attorney, Agent, or Firm*—Leong C. Lei

(57) ABSTRACT

An exhaust ventilator includes a frame in which are mounted a plurality of conductive wires mounted in parallel across two inner opposite sides of the frame, two fans arranged in the frame, and a power supply installed at one corner of the frame and capable of supplying high voltage and low current to the conductive wires for killing bugs and mosquitoes and provided with switches for controlling speed of the fans, whereby the exhaust ventilator can be used as an air ventilator as well as a device for driving away mosquitoes.

1 Claim, 7 Drawing Sheets

EXHAUST VENTILATOR CAPABLE OF DRIVING AWAY MOSQUITOES

BACKGROUND OF THE INVENTION

1. Field of the Invention

This invention is related to an exhaust ventilator and in particular to one which can be used for driving away mosquitoes.

2. Description of the Prior Art

The conventional mosquito killing lantern and mosquito killing racket utilize high voltage with low current to kill mosquitoes. However, the mosquito does not seek a person by sight, but by the body smell of the person, so that even if one stays in a room with the door closed, the mosquito will try all means to go into the room to sting him or her.

Therefore, it is an object of the present invention to provide an exhaust ventilator which can obviate and mitigate the above-mentioned drawbacks.

SUMMARY OF THE INVENTION

This invention is related to an exhaust ventilator.

It is the primary object of the present invention to provide an exhaust ventilator which can be used as an air ventilator as well as a device for driving away mosquitoes.

It is another object of the present invention to provide an exhaust ventilator which can extract the body smell of a person from one room to another thereby preventing mosquitoes from going into the room to sting the person through detecting the body smell of a person.

It is still another object of the present invention to provide an exhaust ventilator which utilizes conducting wires with high voltage and low current to kill bugs and mosquitoes.

It is a further object of the present invention to provide an exhaust ventilator which can easily engage with other similar ventilators in the building of a self-assembled house.

According to a preferred embodiment of the present invention, an exhaust ventilator includes a frame in which are mounted a plurality of conductive wires mounted in parallel across two inner opposite sides of the frame, two fans arranged in the frame, and a power supply installed at one corner of the frame and capable of supplying high voltage and low current to the conductive wires for killing bugs and mosquitoes and provided with switches for controlling speed of the fans.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
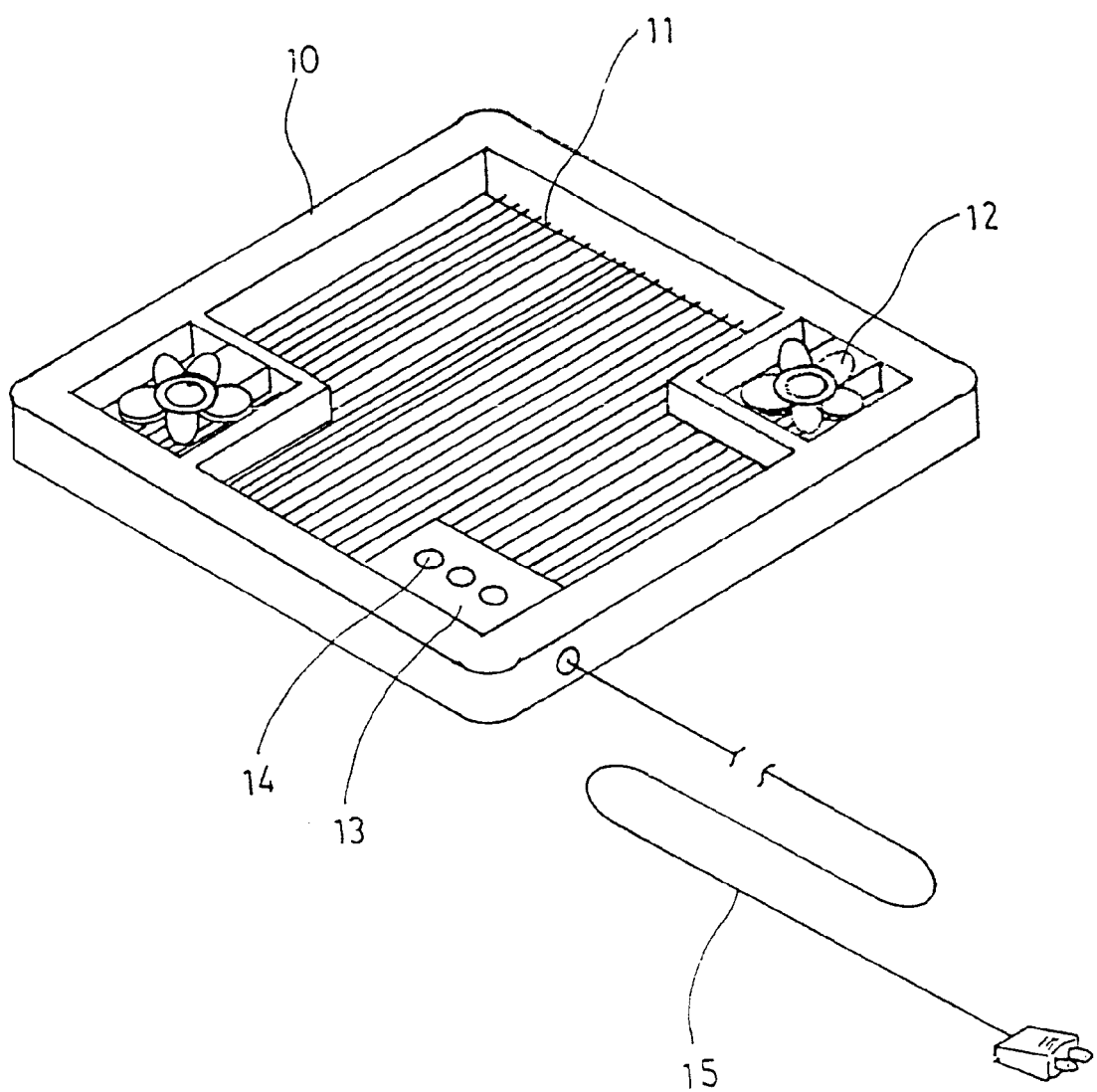
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
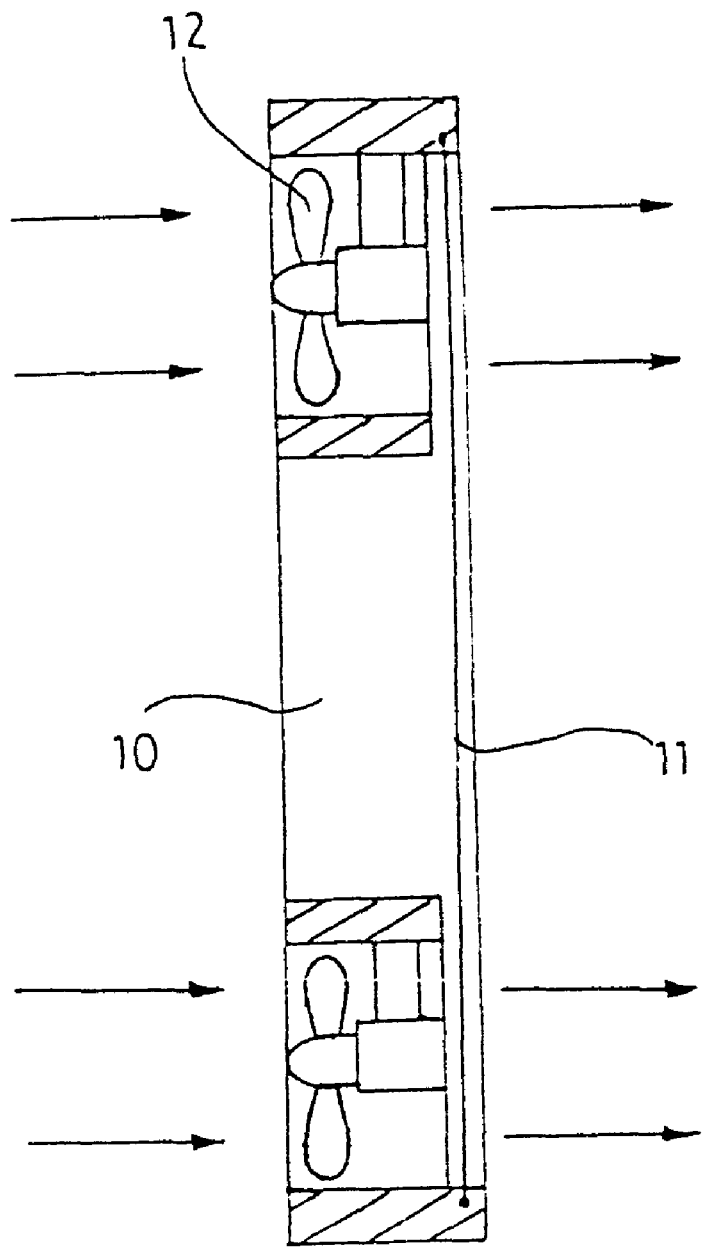
FIG. 2 is a sectional view of the present invention.

With reference to the drawings and in particular to FIGS. 1 and 2 thereof, the exhaust ventilator according to the present invention comprises a frame 10, which can be of any desired shape. The frame 10 is provided with a plurality of conductive wires 11 mounted in parallel across two opposite inner sides of the frame 10. A power supply 13 with high voltage but low current is connected to the conductive wires 11 so that bugs or mosquitoes will be killed upon contact with the conductive wires 11 but human beings and animals will not be injured. Two diametrically opposite corners of the frame 10 are each provided with a fan 12. The power supply 13 with a plurality of switches 14 is installed at another corner of the frame 10. The power supply 13 is connected with a main via an electrical cord 15 and may be provided with batteries therein. The switches 14 are used for controlling the fans 12 to rotate at different speeds, so that the fans 12 can be used as exhaust fans at high speed and as a device for driving mosquitoes at low speed. It should be noted, however, that the wind generated by the fans 12 should not be too strong to prevent mosquitoes from flying towards the conducting wires 11.

Figure 3:
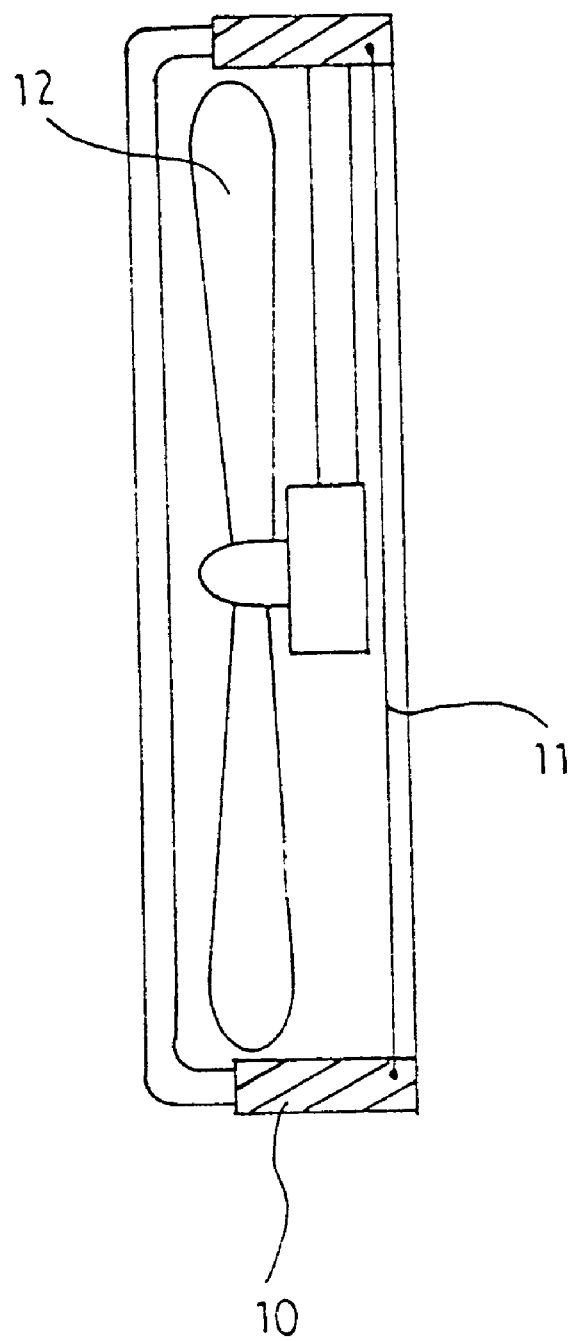
FIG. 3 is a sectional view of another preferred embodiment of the present invention.

FIG. 3 is a sectional view of another preferred embodiment of the present invention. As shown, the fans 12 mounted at diametrically opposite corners of the frame 10 are replaced with a large fan 12 installed at the central portion of the frame 10.

Figure 4:
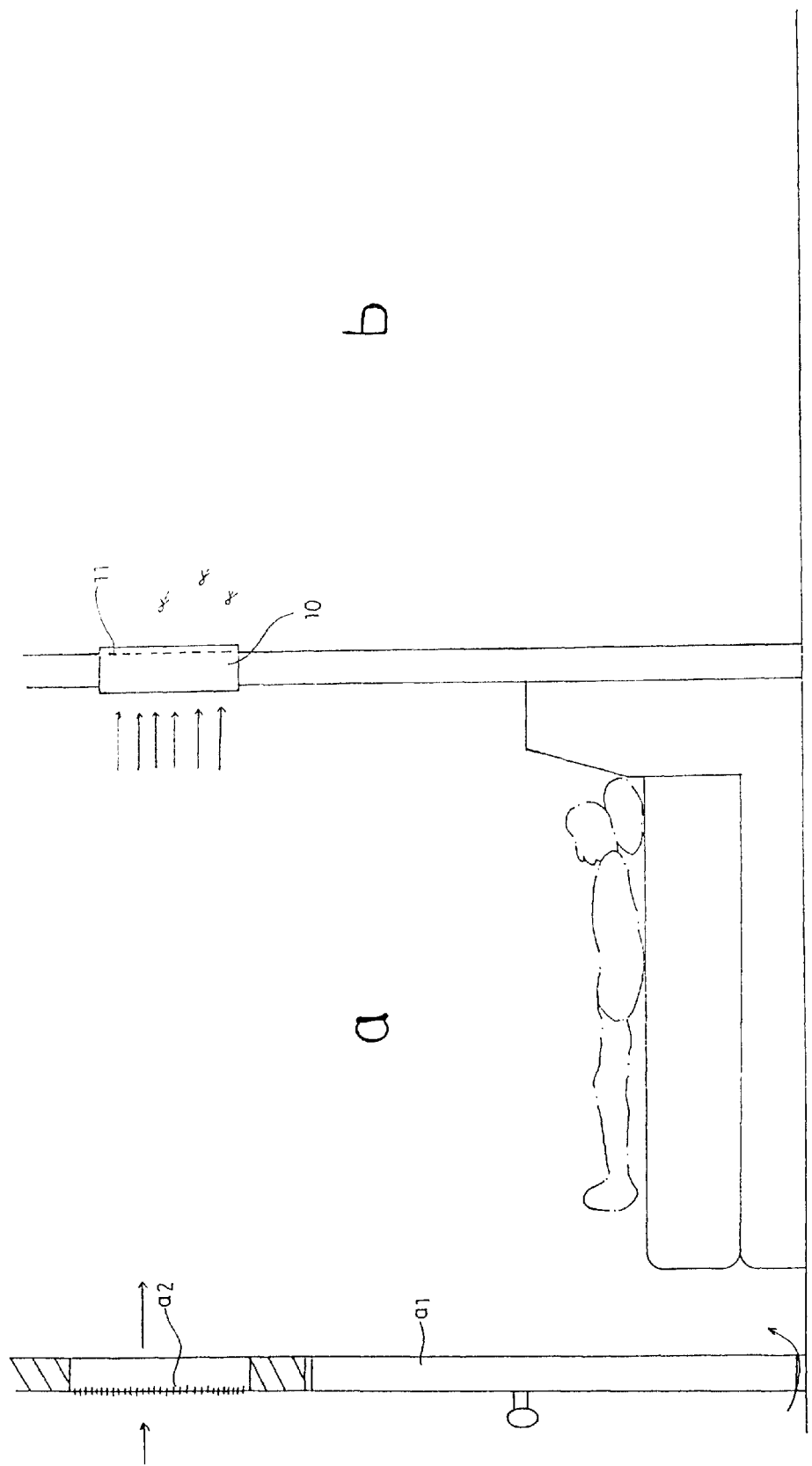
FIG. 4 illustrates the working principle of the present invention.

Referring to FIG. 4, the exhaust ventilator according to the present invention is mounted on a partition between two spaces a and b so that the body smells of the person in the space a will be extracted to the space b thereby attracting mosquitoes to fly towards the exhaust ventilator and therefore causing them to be killed by the conducting wires 11. Meanwhile, as the body smells of the person in the space a are extracted out to the space b and no body smells of the person will go out of the gap al between the door and the door frame or doorscreen a2, mosquitoes will not fly into the space a through the gap al between the door and the door frame or screen a2 thereby preventing the person in space a from being stung by mosquitoes.

In addition, as the exhaust ventilator extracts air from the space a to the space b, there will be an air current flowing from the space a to the space b thereby preventing mosquitoes from tracking the body smells of the person in the space a through the gap al between the door and the door frame and the screen a2 and preventing mosquitoes from flying into the space a through the gap al between the door and the door frame and the screen a2.

Figure 5:
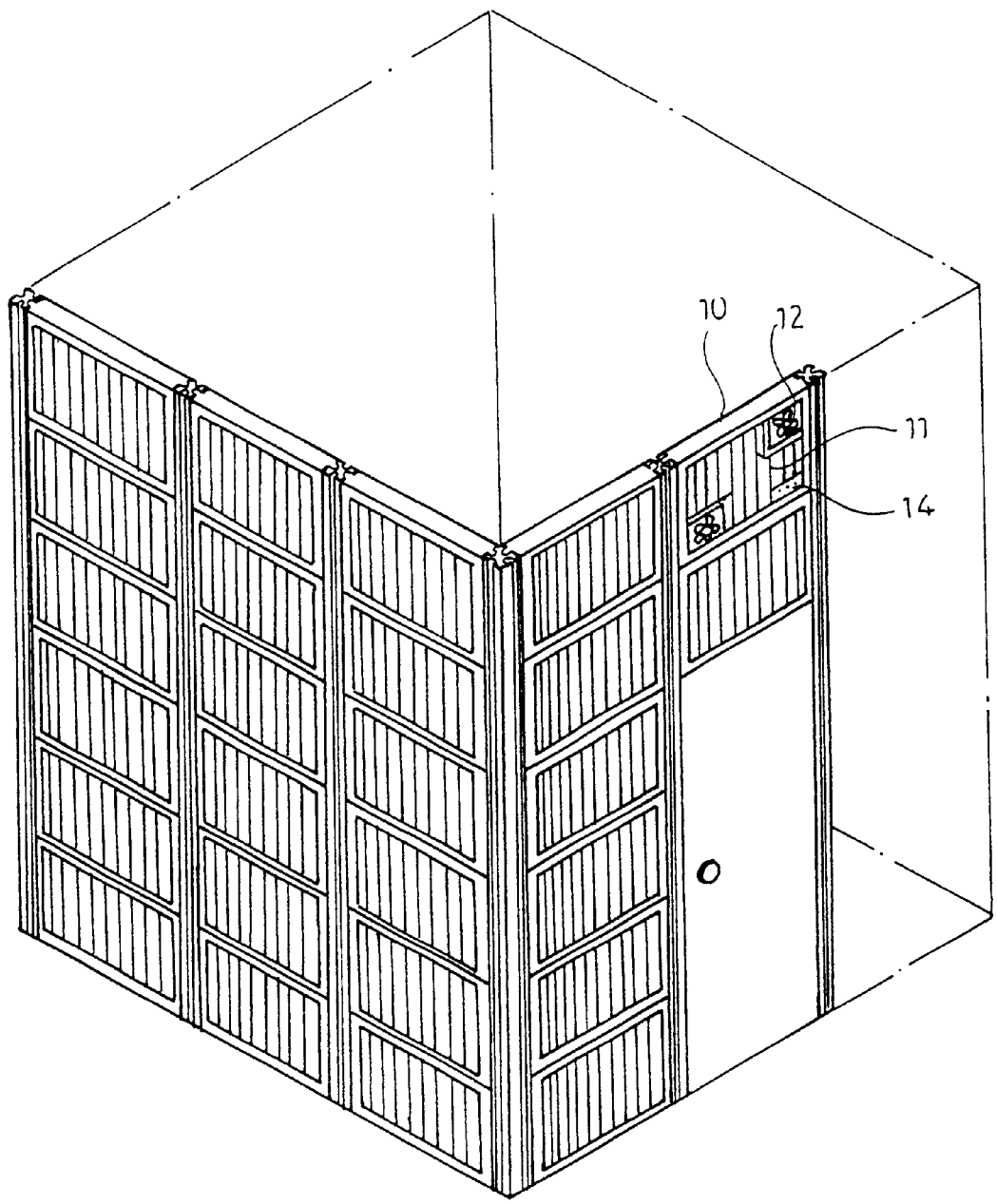
FIG. 5 illustrates how to use a plurality of exhaust ventilators to build a self-assembled house.
Figure 6:
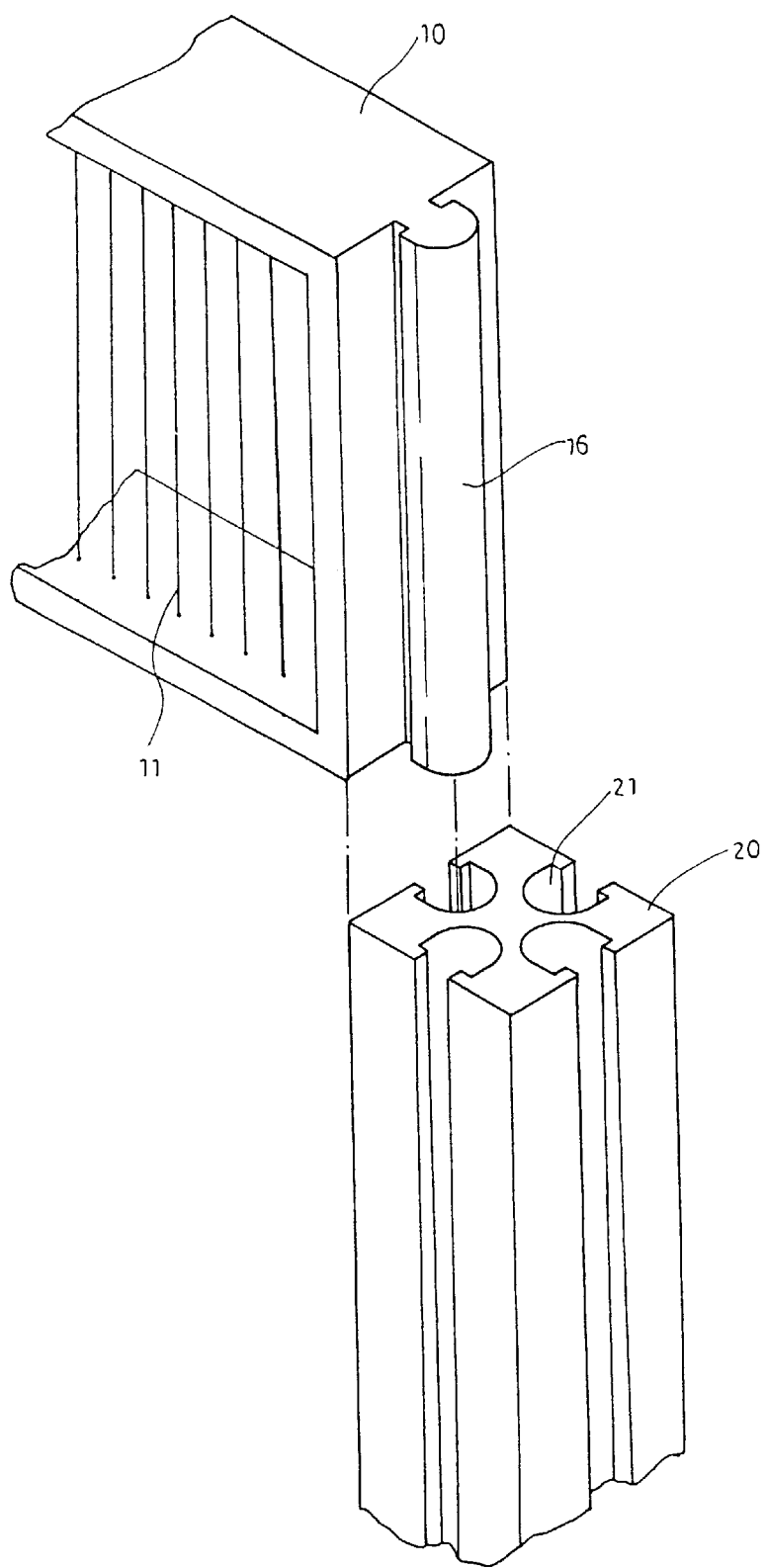
FIG. 6 illustrates how an exhaust ventilator is engaged with a connector.
Figure 7:
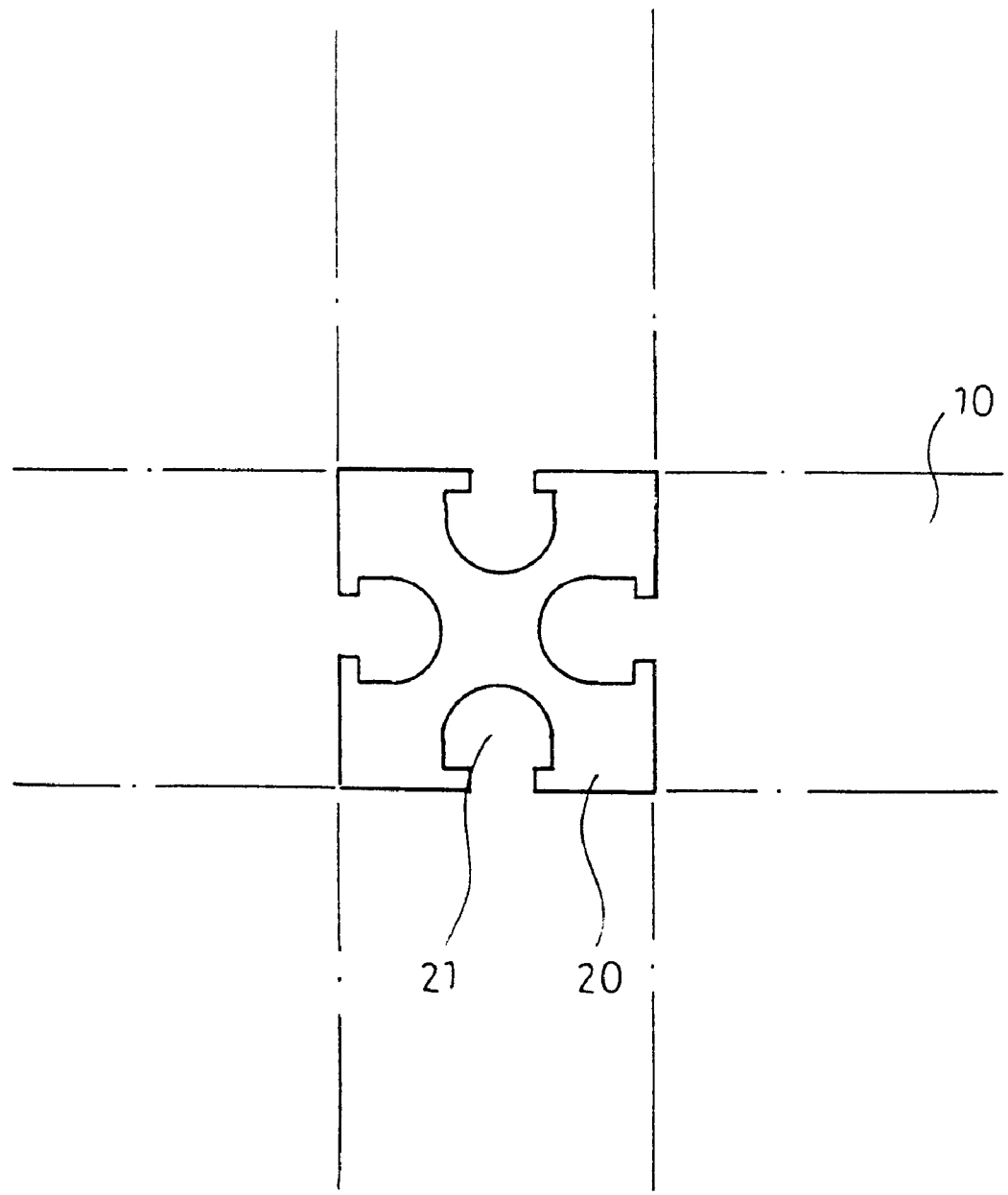
FIG. 7 is a top plan view of the connector.

Referring to FIG. 6, the frame 10 is formed with an elongated fib 16 extending along two opposite outer sides thereof. Hence, a plurality of the exhaust ventilators according to the present invention can be assembled to form a self-assembled house, by engaging the elongated ribs 16 of the frames 10 with a rectangular connector 20 (see FIG. 7) formed with four longitudinal grooves 21 at four sides configured to engage with the elongated ribs 16 (see FIG. 5). Consequently, this self-assembled house will be very helpful for the researcher living in the wild to prevent being stung by mosquitoes. In addition, the high voltage of the conducting wires 11 will prevent animals from entering the self-assembled house (the current is very low so that animals will not be injured).

Furthermore, the exhaust ventilators for constituting the assembled house may not need the fan 12, because the natural wind flowing through the house can also drive away the body smell of a person living therein.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An exhaust ventilator comprising a frame in which are mounted a plurality of conductive wires mounted parallel to each other across two inner opposite sides of said frame, two fans arranged in said frame, and a power supply installed at one corner of said frame and capable of supplying high voltage and low current to said conductive wires for killing bugs and mosquitoes and provided with switches for controlling speed of said fans, wherein the two fans are mounted in two diametrically opposite inner corners of said frame, said frame has an elongated rib extending along two opposite outer sides thereof and configured to engage with one of four longitudinal grooves of a connector.

* * * * *